INVENTOR.
BALTHASAR H. PINCKAERS
BY
Omund R. Dahle
ATTORNEY

United States Patent Office 3,328,606

Patented June 27, 1967

3,328,606

SCR BIDIRECTIONAL SWITCH APPARATUS HAVING VARIABLE IMPEDANCE INPUT CONTROL CIRCUIT

Balthasar H. Pinckaers, Edina, Minn., assignor to Honeywell Inc., Minneapolis, Minn., a corporation of Delaware Filed Nov. 2, 1964, Ser. No. 408,277
6 Claims. (Cl. 307—88.5)

Figure 1:
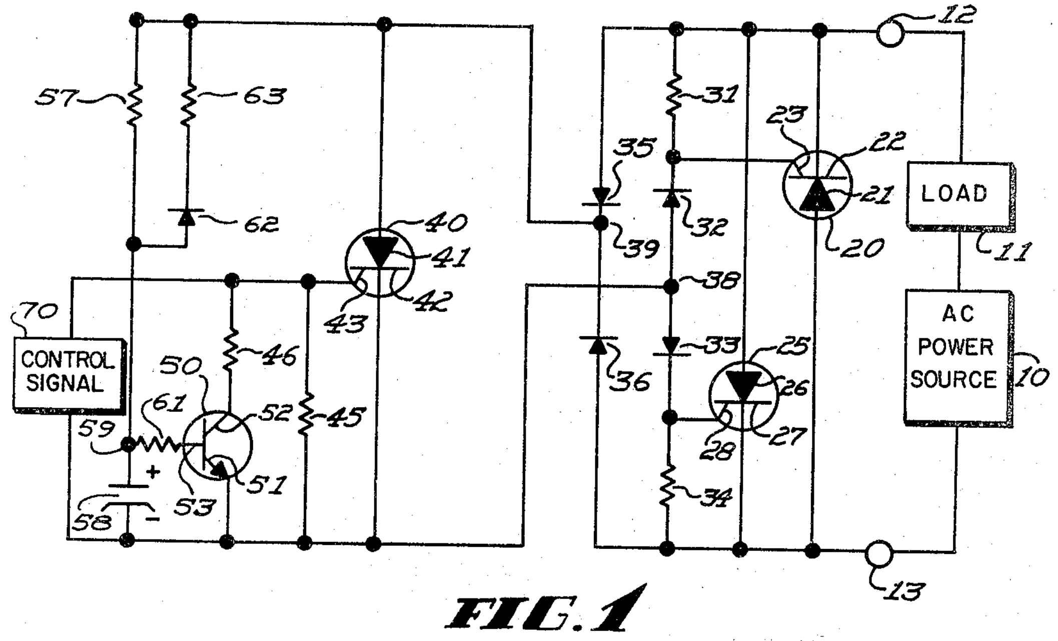

This invention is concerned with control circuits, and more particularly with an electronic switch having a differential.

An embodiment of this invention has a pair of parallel-inverse or back-to-back connected controlled rectifiers connected across a serial combination of a load and A.C. power source. This configuration is well known in the art and it is therefore the method of gating on the controlled rectifiers which is of primary importance to the understanding of this invention. It is proposed to use a third controlled rectifier connected by a bridge rectifying circuit to the source of power and to the gate electrodes of the controlled rectifier. The third controlled rectifier may be of a very low power type, and thus comparatively inexpensive. The gate electrode of the third controlled rectifier is connected to a differential establishing circuit comprising a parallel combination including one branch having resistance means and another branch having a serial combination of a resistance means and a transistor output circuit. A capacitor is connected through a resistor to the control electrode of the transistor such that when the third controlled rectifier is off the transistor is on to establish a first value of resistance for the serial combination. A control signal of a predetermined magnitude is applied to turn on the third controlled rectifier at which time the capacitor will discharge to turn off the transistor and vary the impedance of the parallel circuit. Therefore a different magnitude of control signal is necessary to turn off the controlled rectifier and a differential has been established by varying the impedance of the input circuit connected to the control electrode of the third controlled rectifier. The control signal may be a voltage or current input to the parallel branch or, if the third controlled rectifier is light sensitive, the control signal may be light energy.

It is an object of this invention to provide an electronic switch having an automatic differential.

It is another object of this invention to provide an electronic bidirectional switch in which the electronic contacts of the switch are controlled by a controlled rectification device, and where the input circuit for the controlled rectification device is a variable impedance circuit for establishing a differential for the switch.

It is another object of this invention to provide a differential circuit for a control circuit in which a controlled rectifying device having a variable impedance in its control circuit is connected by bridge rectification means to an A.C. control circuit.

It is yet another object of this invention to provide a differential establishing circuit for a pair of electronic bidirectional contacts, said differential circuit comprising a controlled rectifier having a variable impedance in its control circuit where the variation of impedance is accomplished by switching one resistor in and out of circuit with other resistances.

Figure 2:
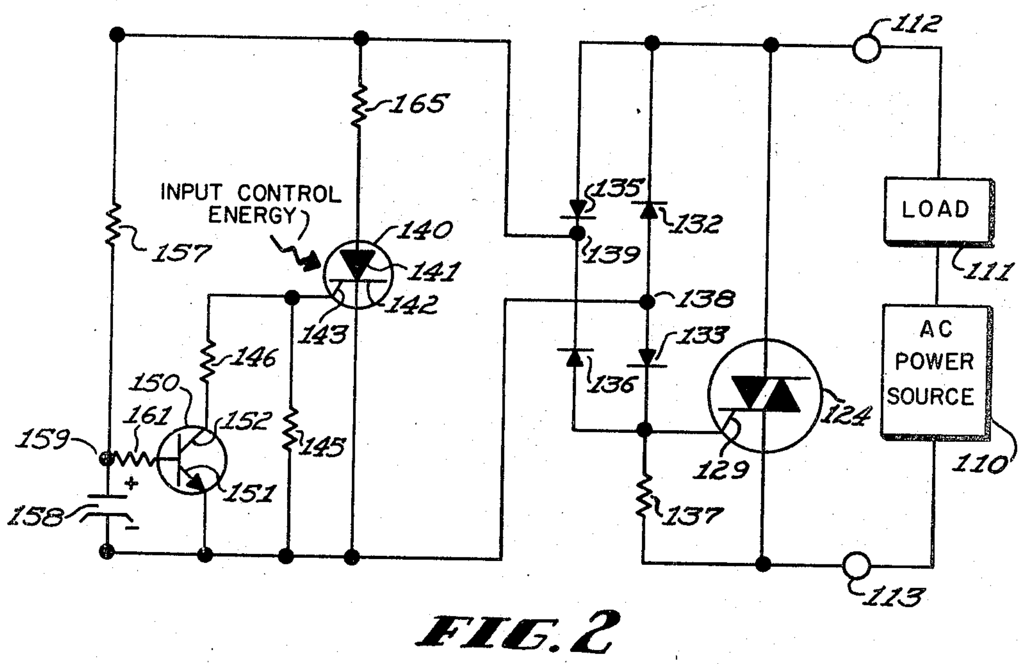

It is a still further object of this invention to provide a differential establishing circuit having a pair of electronic bidirectional contacts, where the differential is achieved by varying the impedance of the control circuit having a low power controlled rectifier, and where the variation is accomplished by varying the bias to a parent control device in the control circuit. These and other objects of this invention will become apparent upon consideration of the following claims, specification and drawings, of which:

FIGURE 1 is a schematic representation of one embodiment of this invention using a pair of parallel inverse connected controlled rectifiers and a third controlled rectifier requiring a direct gate input control signal, and FIGURE 2 is another embodiment of this invention using a bidirectional controlled rectifier having a single gate input electrode, and using a third controlled rectifier sensitive to light energy.

An embodiment of FIGURE 1 discloses a pair of terminals 12 and 13 across which are serially connected a load 11 and a source of A.C. power 10. There is also disclosed a pair of controlled rectifiers 20 and 25. Controlled rectifier 20 has an anode 21, a cathode 22 and a gate 23. Controlled rectifier 25 has an anode 26, a cathode 27 and a gate 28. Cathode 22 and anode 26 are connected to terminal 12, while anode 21 and cathode 27 are connected to terminal 13, to thus connect controlled rectifiers 20 and 25 in parallel-inverse relation across the terminals 12 and 13. Also connected across terminals 12 and 13 is a serial branch comprising, in sequence, a resistor 31, a diode 32, a diode 33 and a resistor 34. Another serial branch connected between terminals 12 and 13 comprises a diode 35 and a diode 36. Diodes 32, 33, 35 and 36 are poled so as to form a full wave bridge rectification circuit.

There is also disclosed a controlled rectifier 40 having an anode 41, a cathode 42 and a gate 43. Anode 41 is connected to a terminal 39 between diodes 35 and 36. Cathode 42 is connected to a terminal 38 between diodes 32 and 33. Thus the controlled rectifier 40 is connected to the unidirectional output of the bridge rectifier comprising the diodes 32, 33, 35 and 36. A resistor 45 is connected between gate 43 and cathode 42. A transistor 50 is shown having an emitter 51, a collector 52 and a base 53. A resistor 46 is connected between gate 43 and collector 52. Emitter 51 is connected to cathode 42. A resistor 57 and a capacitor 58 are connected between anode 41 and cathode 42. Base 53 is connected by a resistor 61 to a terminal 59 between resistor 57 and capacitor 58. A serial combination of a diode 62 and a resistor 63 is connected across resistor 57. A source of control signal 70 is connected between gate 43 and cathode 42.

To best understand the operation of FIGURE 1 it should first be assumed that the control signal 70 is less then a predetermined magnitude at which it is desired to turn on the switch. This will means that controlled rectifier 40 is off and therefore that controlled rectifiers 20 and 25 are off. The bidirectional or AC power supply 10 will then be presenting power to the input of the full wave bridge rectification circuit comprising diodes 32, 33, 35 and 36. Across the unidirectional output terminals 38 and 39 of the bridge will appear a pulsating unidirectional voltage representing the full wave rectification. This pulsating voltage appears from anode 41 to cathode 42 of controlled rectifier 40, however, controlled rectifier 40 will not turn on due to the absence of a sufficient current in gate 43. The pulsating voltage will also be felt across the branch comprising resistor 57 and capacitor 58. Capacitor 58 will therefore charge to a value of voltage of the polarity shown.

The voltage stored in capacitor 58 will forward bias the base 53 to emitter 51 junction of transistor 50. A current will therefore flow from the positive plate of capacitor 58, through resistor 61, from base 53 to emitter 51, and back to the negative plate of capacitor 58. It should be noted that resistor 57 is chosen such that the charge on capacitor 58 never goes below a predetermined value despite the fact that the charging voltage is a pulsating voltage.

The base to emitter current flow in transistor 50 will, by proper design, effectively connect resistor 46 in parallel with resistor 45. This results in an impedance in the input gate circuit of controlled rectifier 40 which is lower than the impedance of resistor 45 alone. The effect of this lower impedance is to require a higher input magnitude from the control signal 70 to gate on controlled rectifier 40.

Now assume that the magnitude of control signal 70 reaches a predetermined magnitude at which there is sufficient current into gate 43 to turn on controlled rectifier 40, which is forward biased by the pulsating voltage. One effect of the turn on of controlled rectifier 40 is the gating on of either controlled rectifier 20 or 25. If terminal 12 is positive with respect to terminal 13 there will be a current flow from terminal 12 through diode 35, through terminal 39, from anode 41 to cathode 42 of controlled rectifier 40, through terminal 38, through diode 33, and through resistor 34 to terminal 13. The current flow through resistor 34 will cause a gate current to flow into gate 28 to turn on controlled rectifier 25. If terminal 13 is positive with respect to terminal 12 there will be a current flow from terminal 13 through diode 36, through terminal 39, from anode 41 to cathode 42 of controlled rectifier 40, through terminal 38, through diode 32 and through resistor 31 to terminal 12. This current through resistor 31 will result in a current flow into gate 23 to turn on controlled rectifier 20. It should be noted that when the gate currents are present at gates 23 or 28, the respective controlled rectifier 20 or 25 is forward biased so that it will turn on in the presence of gate current.

Another effect of the turn on of controlled rectifier 40 is the creation of a discharge path for capacitor 58. The discharge current will flow from the positive plate of capacitor 58, through terminal 59, through diode 62 and resistor 63, from anode 41 to cathode 42 of controlled rectifier 40, and back to the negative plate of capacitor 58. Note that a portion of the current will also discharge through resistor 57 but the resistor 63 is chosen to allow a faster discharge of the capacitor 58. Note also that the branch comprising diode 62 and resistor 63 is not a mandatory part of this circuit if resistor 57 is chosen of a value which would allow the proper discharge of capacitor 58.

When capacitor 58 has substantially discharged, base 53 will no longer be forward biased with respect to emitter 51, thus transistor 50 will be off or non-conductive. Thus the discharge of capacitor 58 has the effect of turning off transistor 50 to remove resistor 46 from the circuit. This will increase the value of the gate input circuit impedance to that of resistor 45. The effect of this increased impedance is that a greater part of the control signal flows into gate 43, which means that the control signal itself can be decreased before controlled rectifier 40 no longer fires. The overall effect of the change of impedance is to create a differential for the switch. Variation of the gate circuit input impedance, accomplished by turning off transistor 50, will in turn vary the input current necessary to turn on controlled rectifier 40.

When the input control signal 70 has dropped below the gate-on level determined by resistor 45, controlled rectifier 40 will no longer turn on and the pulsating voltage across terminals 38 and 39 will again charge capacitor 58, as previously described, to again turn on transistor 50 to return the circuit to its original stand-by condition .

It is thus apparent that the embodiment of FIGURE 1 is an electronic switch having an automatic differential. The controlled rectifiers 20 and 25 represent the contacts of the switch, and the automatic differential is achieved by using the turn on and turn off of transistor 50 to vary the impedance of the gate input circuit.

The embodiment of FIGURE 2 discloses a pair of terminals 112 and 113. A serial combination of a source of AC power 110 and a load 111 is connected between terminals 112 and 113. Also connected between terminals 112 and 113 is a bidirectional controlled rectifier 124 having a gate electrode 129. The bidirectional controlled rectifier is here shown as a Triac. A resistor 137 is connected between terminal 113 and gate 129. A pair of oppositely poled diodes 132 and 133 are serially connected between terminal 112 and gate 129. Another pair of oppositely poled diodes 135 and 136 are serially connected between terminal 112 and gate 129. The four diodes 132, 133, 135 and 136 are all poled so as to embody a full wave bridge rectification network. There is also shown a light activated controlled rectifier 140 having an anode 141, a cathode 142 and a gate 143. A resistor 165 is connected between anode 141 and a terminal 139 between diodes 135 and 136. Cathode 142 is connected to a terminal 138 between diodes 132 and 133. Thus light activated controlled rectifier 140 is connected across the unidirectional output of the bridge rectification network comprising diodes 132, 133, 135 and 136. A serial combination of resistor 157 and a capacitor 158 is connected between terminals 139 and 138. A resistor 145 is connected between gate 143 and cathode 142. A transistor 150 is disclosed having an emitter 151, a collector 152 and a base 153. A resistor 146 is connected between collector 152 and gate 143. Emitter 151 is connected to cathode 142. A serial combination of a resistor 157 and a capacitor 158 is connected between terminals 136 and 139. Base 153 is connected by a resistor 161 to a terminal 159 between resistor 157 and capacitor 158.

The operation of FIGURE 2 can best be understood by first assuming that there is no input light energy to turn on light activated rectifier 140, and that therefore there is no gate-on current to bidirectional controlled rectifier 124. The bidirectional or A.C. power supply 110 will cause an alternating voltage to appear between terminals 112 and 113. This voltage will appear across the full wave bridge rectification circuit, comprising diodes 132, 133, 135 and 136. As a result there will be a unidirectional pulsating voltage across terminals 138 and 139. This unidirectional pulsating voltage will appear across light activated rectifier 140. However, light activated rectifier 140 is biased by resistor 145 so as not to turn on as a result of the presence of the pulsating voltage.

The bidirectional pulsating voltage will also appear across the branch comprising resistor 157 and capacitor 158. Capacitor 158 will charge to a voltage having the polarities shown. As described in the above discussion of the operation of FIGURE 1, the voltage across capacitor 58 will result in a turn on of transistor 150 by providing a current flow from the positive plate of capacitor 158, through resistor 161, from base 153 to emitter 151 of transistor 150 and back to the negative plate of capacitor 158. This will result in an effective turn on of transistor 150 to thus connect resistor 146 in parallel with resistor 145. This presents a lower impedance to the gate 143 of controlled rectifier 140 than would resistor 145 standing alone. The result of this lower impedance is to bias light activated rectifier 140 such that a greater amount of light energy must be present to turn on light activated rectifier 140. When the light energy present is sufficient to turn on light activated rectifier 140, it will turn on due to the forward bias caused by the pulsating voltage between terminals 138 and 139.

One effect of the turn on of light activated rectifier 140 is to provide a gate-on current for bidirectional controlled rectifier 124. When terminal 112 is positive with respect to terminal 113 the gate current will flow from terminal 112 through diode 135 and terminal 139, through resistor 165. from anode 141 to cathode 142 of light activated rectifier 140, through terminal 138 and diode 133, and through resistor 137 to terminal 113. The current through resistor 137 will cause a voltage drop of a polarity to cause a positive gate current flow into gate 129 of bidirectional controlled rectifier 124. Since terminal 112 is positive with respect to terminal 113, bidirectional controlled rectifier 124 will turn on to allow a curent flow from terminal 112 through bidirectional control rectifier 124, to terminal 113. Thus load 111 is directly connected across A.C. power supply 110.

When terminal 113 is positive with respect to terminal 112 a current will flow from terminal 113 through resistor 137 through diode 136 and terminal 139, through resistor 165, from anode 141 to cathode 142 of light activated rectifier 140, through terminal 138 and diode 132 to terminal 112. This current flow through resistor 137 will result in a voltage drop across resistor 137 such as to provide a negative current flow into gate 129. Since terminal 113 is positive with respect to terminal 112, bidirectional controlled rectifier 124 will turn on to allow a current flow from terminal 113 through bidirectional controlled rectifier 124 to terminal 112. Thus on the second half cycle of A.C. voltage load 111 is again directly connected across A.C. power supply 110.

Another effect of the turn on of light activated rectifier 140 is to present a discharge path for capacitor 158. The discharge current will flow from the positive plate of capacitor 158 through resistor 157 and resistor 165, from anode 141 to cathode 142 of light activated rectifier 140 and back to the negative path of capacitor 158. The discharge of capacitor 158 will remove the forward base-to-emitter bias on transistor 150 to effectively turn off transistor 150 and remove resistor 146 from the circuit. The input gate impedance of light activated rectifier 140 is then increased to the value of resistor 145. The effect of this increase in gate input impedance is to lower the amount of light energy necessary to turn on light activated rectifier 140. Thus again a differential has been established by turning off an electronic switch to vary the gate input impedance of the control circuit. When the magnitude of light energy present has dropped below the amount necessary to turn on light activated rectifier 140, when biased by resistor 145 alone, the light activated rectifier 140 will no longer turn on, there will no longer be a gate current to turn on bidirectional controlled rectifier 124, capacitor 158 will charge to its previous value to again switch on transistor 150 to place resistor 146 in parallel with resistor 145, and the circuit will again be in the original standby condition.

Thus it can be seen that the embodiment of FIGURE 2 also represents an electronic switch. The contacts of the switch are represented by bidirectional controlled rectifier 124, here schematically shown as a Triac, and the differential for the switch is automatically effected by using transistor 150 to vary the gate input impedance of light activated rectifier 140.

It will be obvious that the general principles herein disclosed may be embodied in many other forms other than that specifically illustrated without departing from the spirit of the invention as defined in the following claims.

What is claimed is:

1. Control appartus comprising:

first and second terminals;

a source of bidirectional energy and a load serially connected between said terminals;

first and second controlled current carrying devices each having input, output and control electrodes;

means connecting said first and second devices input and output electrodes to said terminals so that said first and second devices are connected in parallel-inverse relation;

voltage bridge rectification means having bidirectional input terminals and unidirectional output terminals;

a portion of said bridge means connecting said first and second devices control electrodes, respectively, to said first and second terminals;

means connecting said input terminals to said first and second terminals;

a third controlled current carrying device having input, output and control electrodes;

means connecting said third device input electrode to one of said output terminals;

means connecting said third device output electrode to another of said output terminals;

means including energy storage means connected across said output terminals;

first impedance means connected between said third device control electrode and output electrode;

second impedance means connected across said first impedance means including switching means having a control electrode connected to said energy storage means, for varying the input impedance to said third device control electrode by switching said second impedance means out of circuit with said first impedance means;

and a source of control signal connected across said first impedance means.

2. A differential circuit for a control circuit comprising:

bridge rectification means having bidirectional input terminals and unidirectional output terminals;

means connecting a source of bidirectional energy across said input terminals;

a controlled rectifier having input, output and gate electrodes;

means connecting said input electrode to one of said output terminals;

means connecting said output electrode to another of said output terminals;

a source of control energy adapted to turn on said controlled rectifier;

means including energy storage means connected across said output terminals so that said energy storage means charges when said controlled rectifier is off and discharges when said controlled rectifier is on;

impedance means connected between said gate electrode and said output electrode for determining the turn-on level of said controlled rectifier; said impedance means including switch means having a control electrode;

means connecting said control electrode to said energy storage means so that when said energy storage discharges, said switch means will switch to vary the impedance of said impedance means to determine a turn-off level for said controlled rectifier different than said turn-on level;

and means connecting said controlled rectifier output electrode to said control circuit.

3. The differential circuit of claim 2 in which said controlled rectifier is a light activated controlled rectifier, and said source of control energy is a source of light energy.

4. The differential circuit of claim 2 in which said source of control energy is a source of unidirectional energy connected across said impedance means.

5. In an electronic switch in which a bidirectional controlled rectification means having a control circuit is connected across a load circuit including a source of bidirectional energy and a load, control means for said rectification means comprising:

bridge rectification means having bidirectional input terminals and unidirectional output terminals;

means connecting said bidirectional input terminals accross said load circuit;

a light activated controlled rectifier having an output circuit and a gate circuit;

means connecting said output circuit, across said unidirectional output terminals;:

means connecting said output circuit to said rectification means control circuit so that a current flow through said controlled rectifier will turn on said rectification means;

means including a capacitor connected across said unidirectional output terminals;

variable impedance means connected in circuit across said gate circuit for establishing a first turn-on level for said controlled rectifier, said variable impedance means including switch means having a control electrode;

means connecting said control electrode to said capacitor for establishing second turn-on level by varying the impedance of said variable impedance means;

and a source of light energy adapted to turn on said controlled rectifier.

6. In an electronic switch in which a bidirectional controlled rectification means having a control circuit is connected across a load circuit including a source of bidirectional energy and a load, control means for said rectification means comprising:

bridge rectification means having bidirectional input terminals and unidirectional output terminals;

means connecting said bidirectional input terminals across said load circuit;

a controlled rectifier having an output circuit and a gate circuit, said controlled rectifier being activated by a unidirectional current input to said gate circuit;

means connecting said output circuit across said unidirectional output terminals;

means connecting said output circuit to said rectification means control circuit so that a current flow through said controlled rectifier will turn on said rectification means;

means including a capacitor connected across said unidirectional output terminals;

variable impedance means connected in circuit across said gate circuit for establishing a first turn-on level for said controlled rectifier, said variable impedance means including switch means having a control electrode;

means connecting said control electrode to said capacitor for establishing second turn-on level by varying the impedance of said variable impedance means;

and a source of unidirectional current connected across said gate circuit adapted to turn on said controlled rectifier.

References Cited

UNITED STATES PATENTS 3,146,392 8/1964 Sylvan ------------- 323—22

ARTHUR GAUSS, *Primary Examiner.*

S. D. MILLER, *Assistant Examiner.*